US006011999A

United States Patent [19]

Holmes

[11] Patent Number: 6,011,999

[45] Date of Patent: Jan. 4, 2000

[54] APPARATUS FOR CONTROLLED DISPENSING OF PHARMACEUTICAL AND MEDICAL SUPPLIES

[75] Inventor: William K. Holmes, San Diego, Calif.

[73] Assignee: Omnicell Technologies, Inc., Palo Alto, Calif.

[21] Appl. No.: 08/985,448

[22] Filed: Dec. 5, 1997

[51] Int. Cl.[7] .......... G06F 17/00

[52] U.S. Cl. .......... 700/231; 700/237; 700/242; 312/215

[58] Field of Search .......... 364/479.01, 479.02, 364/479.06, 479.09, 479.11, 479.12, 479.14, 478.01; 221/2, 5, 9, 151–159, 256; 312/209, 215, 222; 337/140; 434/159, 161; 318/117; 310/307; 700/231, 232, 236, 237, 241, 242, 244, 213

[56] References Cited

U.S. PATENT DOCUMENTS

| | | | |
|---|---|---|---|
| Re. 35,743 | 3/1998 | Pearson | 221/2 |
| 3,556,342 | 1/1971 | Guarr | 221/2 |
| 3,715,148 | 2/1973 | Beals | 312/209 |
| 3,744,867 | 7/1973 | Shaw | 312/234 |
| 3,762,601 | 10/1973 | McLaughlin | 221/2 |
| 3,883,885 | 5/1975 | Orlando | 354/258 |
| 3,917,045 | 11/1975 | Williams et al. | 194/4 |
| 3,998,356 | 12/1976 | Christensen | 221/2 |
| 4,019,793 | 4/1977 | Gerding | 312/209 |
| 4,114,965 | 9/1978 | Oye et al. | 312/209 |
| 4,127,311 | 11/1978 | Weiman | 312/209 |
| 4,209,211 | 6/1980 | Alford | 312/215 |
| 4,267,942 | 5/1981 | Wick, Jr. et al. | 221/2 |
| 4,360,125 | 11/1982 | Martindale et al. | 221/2 |
| 4,382,688 | 5/1983 | Machamer | 368/10 |
| 4,473,884 | 9/1984 | Behl | 364/479 |
| 4,518,208 | 5/1985 | Marder | 312/209 |
| 4,575,719 | 3/1986 | Bertagna et al. | 340/825.35 |
| 4,588,237 | 5/1986 | Marder | 312/209 |
| 4,626,105 | 12/1986 | Miller | 368/10 |
| 4,635,053 | 1/1987 | Banks et al. | 340/825.31 |
| 4,640,560 | 2/1987 | Blum | 312/234.1 |
| 4,675,472 | 6/1987 | Krumme et al. | 174/52 |
| 4,717,042 | 1/1988 | McLaughlin | 221/3 |
| 4,733,362 | 3/1988 | Haraguchi | 364/479 |
| 4,811,764 | 3/1989 | Mclaughlin | 141/98 |
| 4,813,753 | 3/1989 | Relyea | 312/291 |
| 4,847,764 | 7/1989 | Halvorson | 364/413.02 |
| 4,962,491 | 10/1990 | Schaeffer | 368/21 |
| 4,967,928 | 11/1990 | Carter | 221/2 |
| 5,014,875 | 5/1991 | McLaughlin et al. | 221/2 |
| 5,047,948 | 9/1991 | Turner | 364/479 |
| 5,069,511 | 12/1991 | Swets et al. | 312/107.5 |
| 5,129,753 | 7/1992 | Wesley et al. | 403/322 |
| 5,131,689 | 7/1992 | Bates | 285/87 |

FOREIGN PATENT DOCUMENTS

| | | |
|---|---|---|
| 2130252 | 2/1996 | Canada . |
| WO 95/03587 | 2/1995 | WIPO . |
| WO 96/21925 | 7/1996 | WIPO . |
| WO 98/26746 | 6/1998 | WIPO . |

OTHER PUBLICATIONS

Dynalloy, Inc., Irvine, CA; Brochure/literature “Flexinol” Actuator Wires (available at least as early as Dec. 4, 1976).

*Primary Examiner*—William Grant
*Assistant Examiner*—Steven R. Garland
*Attorney, Agent, or Firm*—Michael Best & Friedrich LLP

[57] ABSTRACT

A dispensing apparatus for controlled dispensing of pharmaceutical and medical supplies which includes a cabinet having a plurality of drawers, the drawers each have a plurality of receptacles, with each receptacle sized to hold one item, and having a lid movable between a closed position and an open position. Selectively actuatable locks are provided for releasably maintaining the lid in the closed position, the locks include an electrically responsive actuator wire connected to the locks and causing movement of the locks in response to an electrical current supplied to the electrically responsive actuator wire. A processor is in communication with the selectively actuatable lock and configured to send a signal to the electrically responsive actuator wire to unlock the lid.

57 Claims, 10 Drawing Sheets

U.S. PATENT DOCUMENTS

| | | | |
|---|---|---|---|
| 5,139,321 | 8/1992 | Beardsley | 312/209 |
| 5,144,813 | 9/1992 | Orner et al. | 62/187 |
| 5,159,581 | 10/1992 | Agans | 368/10 |
| 5,186,420 | 2/1993 | Beauchamp et al. | 244/219 |
| 5,221,024 | 6/1993 | Campbell | 221/3 |
| 5,291,191 | 3/1994 | Moore | 340/825.35 |
| 5,292,029 | 3/1994 | Pearson | 221/2 |
| 5,314,243 | 5/1994 | McDonald et al. | 312/215 |
| 5,392,951 | 2/1995 | Gardner et al. | 221/2 |
| 5,408,443 | 4/1995 | Weinberger | 368/10 |
| 5,437,290 | 8/1995 | Bolger et al. | 128/898 |
| 5,440,287 | 8/1995 | Hassler et al. | 337/168 |
| 5,445,294 | 8/1995 | Gardner et al. | 221/1 |
| 5,460,294 | 10/1995 | Williams | 221/2 |
| 5,537,313 | 7/1996 | Pirelli | 364/403 |
| 5,564,803 | 10/1996 | McDonald et al. | 312/215 |
| 5,573,413 | 11/1996 | David et al. | 439/159 |
| 5,597,316 | 1/1997 | David et al. | 439/159 |
| 5,611,051 | 3/1997 | Pirelli | 395/210 |
| 5,629,662 | 5/1997 | Floyd et al. | 337/36 |
| 5,673,028 | 9/1997 | Levy | 340/635 |
| 5,745,366 | 4/1998 | Higham et al. | 364/479.12 |
| 5,805,455 | 9/1998 | Lipps | 364/479.01 |
| 5,905,653 | 5/1999 | Higham et al. | 364/479.14 |

55
54
61
60'
63
61
60
63
80
80
88
78
76
102
100
98
86'
98
86
94
94
102
100
94
96
94
72

APPARATUS FOR CONTROLLED DISPENSING OF PHARMACEUTICAL AND MEDICAL SUPPLIES

RELATED APPLICATIONS

This application is related to U.S. Patent applications assigned to the assignee of the present invention, those pending applications being U.S. patent application Ser. No. 08/274,926, filed Jul. 14, 1994 titled Device and Method for Providing Access to Items to be Dispensed which issued as U.S. Pat. No. 5,805,456; U.S. patent application Ser. No. 08/544,379, filed Oct. 10, 1995 titled Pharmaceutical Dispensing Device and Methods which issued as U.S. Pat. No. 5,574,366; U.S. patent application Ser. No. 08/320,585, filed Oct. 11, 1994 titled Methods and Apparatus for Dispensing Items; U.S. patent application Ser. No. 08/250,223, filed May 27, 1994 titled Methods and Apparatus for Dispensing Items; U.S. patent application Ser. No. 08/758,863, filed Dec. 2, 1996 titled Methods and Apparatus for Dispensing Items which issued as U.S. Pat. No. 5,805,455 and U.S. patent application Ser. No. 08/761,726, filed Jul. 25, 1997, titled Lighting Device and Method for a Dispensing Device, disclosures of which are incorporated herein by reference.

FIELD OF THE INVENTION

The invention relates to an apparatus for dispensing pharmaceuticals and medical supplies and for maintaining inventory control over such pharmaceuticals and medical supplies.

BACKGROUND OF THE INVENTION

In medical facilities, it is necessary to maintain supplies of pharmaceuticals and controlled medical equipment in storage locations where they are quickly and conveniently accessible to medical staff, while also maintaining accurate inventory control and barring access of controlled substances to unauthorized personnel. The contents of cabinets dispensing such pharmaceuticals and medical equipment are varied depending upon the medical procedures practiced in the medical facility where the cabinet is located. The dispensing cabinets may be returned to a central pharmacy or other location for restocking, or may be restocked on-site by medical or pharmacy staff.

It is important to provide adequate supplies of all the required pharmaceutical and medical supplies and prevent the occurrence of "stock-outs" that can arise if the inventories at the storage locations are not carefully monitored. But, to ensure that sufficient supplies are maintained at the storage locations, overstocking can occur which, in turn, increases the cost of the medical facility inventory systems by requiring more items to be maintained in inventory than are actually used. Overstocking of inventory can also result in waste through spoilage of unused supplies. Excessive restocking is also demanding on the hospital staff who must devote more of their time to monitor the storage locations to ensure that sufficient supplies are available.

One method used to provide pharmaceuticals and medical supplies to the areas of the medical facility where they are used includes dispensing carts or cabinets having computer processors for recording removal of items from the dispensing cabinets. These cabinets commonly include locked drawers having locked pharmaceutical receptacles, and include computer processors. The computer processors commonly provide for limited access by selected medical personnel to such cabinets and receptacles, for restricted access to specific drawers or locations of the cabinet in response to entry of information into the computer processor and for recording inventory information for use by medical staff in ensuring the continuity of the inventory in the cabinets.

In the case of controlled medical supplies and pharmaceuticals, the dispensing cabinets may be designed to provide single unit or single dose dispensing such that removal of each unit is recorded and access to the pharmaceuticals or other medical supplies is available only to authorized and identified persons.

SUMMARY OF THE INVENTION

The present invention provides an improved medical dispensing cabinet and is particularly advantageous for the controlled dispensing of single dose units of pharmaceuticals or medical supplies. The dispensing cabinet embodying the invention provides for dispensing of a maximum variety of pharmaceuticals and medical supplies, while also maintaining accurate control over such items. The dispensing cabinet also provides an arrangement which is easily filled or replenished by the medical staff.

The dispensing cabinet also provides an arrangement of compartments which can be filled by the medical staff in a manner which efficiently uses the space of the cabinet and maximizes the number of different pharmaceuticals or medical supplies made available by the cabinet to medical personnel. The dispensing cabinet also provides a very compact and portable dispensing unit.

The dispensing cabinet embodying the invention also provides for the controlled delivery of pharmaceuticals or medical supplies on a first in, first out basis, such that the medical staff can control the period of storage of the products housed in the cabinet.

The dispensing cabinet embodying the invention also provides for controlled access to only a single unit or to multiple units of medical supplies, depending on the contents of the cabinet and the nature and requirements of the medical practice area where the supply cabinet is located.

The dispensing cabinet is useful for containing a large variety of medical supplies and the array of medical supplies contained in each drawer of the cabinet can be varied by the pharmacist to provide the most effective delivery of supplies to the medical staff.

More specifically, the invention includes a dispensing apparatus for controlled dispensing of pharmaceutical and medical supplies. The dispensing apparatus includes a cabinet having at least one drawer having a plurality of receptacles. Each receptacle has a lid including a selectively actuatable lock with a lock member shiftable between a locking position and an unlocking position. An electrically responsive actuator wire is connected to the lock member. The dispensing apparatus also includes a processor for receiving user information and item identification information, and the processor is in communication with each of the selectively actuatable locks and is configured to send a signal to the electrically responsive actuator wire to unlock at least one selected lid based on user identification, patient and/or item selection information.

The provision of the electrically responsive actuator wire arrangement provides for a reliable, and very compact latch system such that each drawer can include a large number of individually locked storage compartments. The electrically responsive actuator wires are highly reliable and facilitate employment of latch arrangements having an uncomplicated and inexpensive construction with a minimum of moving parts. The use of the compact latch system also facilitates flexibility in the arrangement and size of the compartments provided in the drawer and flexibility in the way products are arranged in the drawer.

In one embodiment of the invention, the processor of the cabinet can be programmed such that where there is more than one dose of a pharmaceutical product contained in the cabinet, the pharmaceutical product placed into the cabinet first will be the first made accessible to the medical personnel such that there is a controlled turnover of the inventory in the cabinet.

In one embodiment of the invention, a locking mechanism is provided for releasing all of the drawers of the cabinet and for permitting unlimited access to the receptacles in the cabinet in the event of an emergency medical situation or for restocking of the cabinet.

In one embodiment of the invention, the drawers are provided with removable trays, the trays each including a plurality of receptacles housing the individual medical supply units. The trays are removable for return to a location such as a pharmacy for restocking. The trays can be provided with a tearable, tamper evident foil or substrate covering the receptacles for quality assurance.

In one embodiment of the invention, the tray and drawer supporting the tray can be provided with sensors, operatively connected to the processor of the cabinet and providing a signal to the processor to indicate proper positioning or orientation of the tray in the drawer, or improper positioning or orientation of the tray in the drawer and can also provide a signal to the processor to indicate the contents of the tray being placed in the drawer.

The dispensing cabinet of the invention also has a construction which facilitates employment of receptacles of different sizes to permit efficient storage and supply of single dose units of various sizes.

DESCRIPTION OF THE PREFERRED EMBODIMENT

Figure 1:
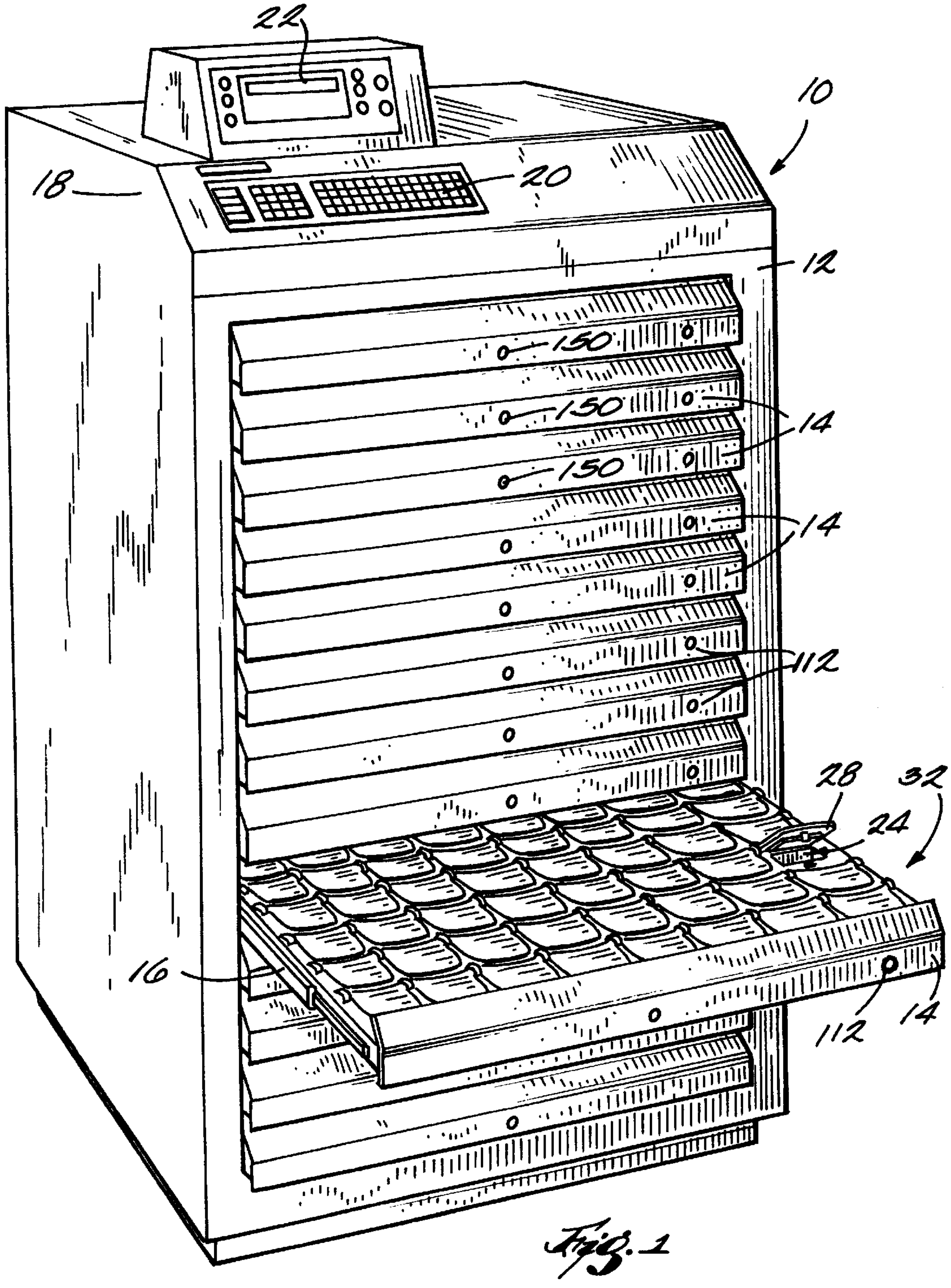
FIG. 1 is a perspective view of a dispensing apparatus embodying the invention.

Illustrated in FIG. 1 is a dispensing apparatus 10 embodying the invention and including a cabinet 12 supporting a plurality of drawers 14 arrayed in vertically stacked relation with respect one another. The drawers 14 can be opened by manually pulling them forward. The drawers 14 are supported on drawer slides 16 for ease of movement. In the particular arrangement shown in the drawings, the drawers 14 are relatively shallow with a width and depth substantially greater than the height of the drawer. In other arrangements, the height, depth and width of the drawers 14 could have other relative dimensions. Additionally, while in the illustrated arrangement the cabinet 12 is illustrated as having thirteen drawers 14, in other constructions the cabinet 12 could have one or more drawers 14, depending on the intended use of the cabinet 12.

The cabinet 12 is provided with a control processor 18 shown in the upper portion of the cabinet 12. The control processor 18 includes a keyboard panel 20 for entry of information into the processor 18 and a display screen 22.

In other arrangements, the cabinet 12 could be incorporated into other structures or could be freestanding or supported by casters for portable movement. The cabinet can also include a printer operably connected to the processor and for producing a printout of the dispensing transactions.

Figure 2:
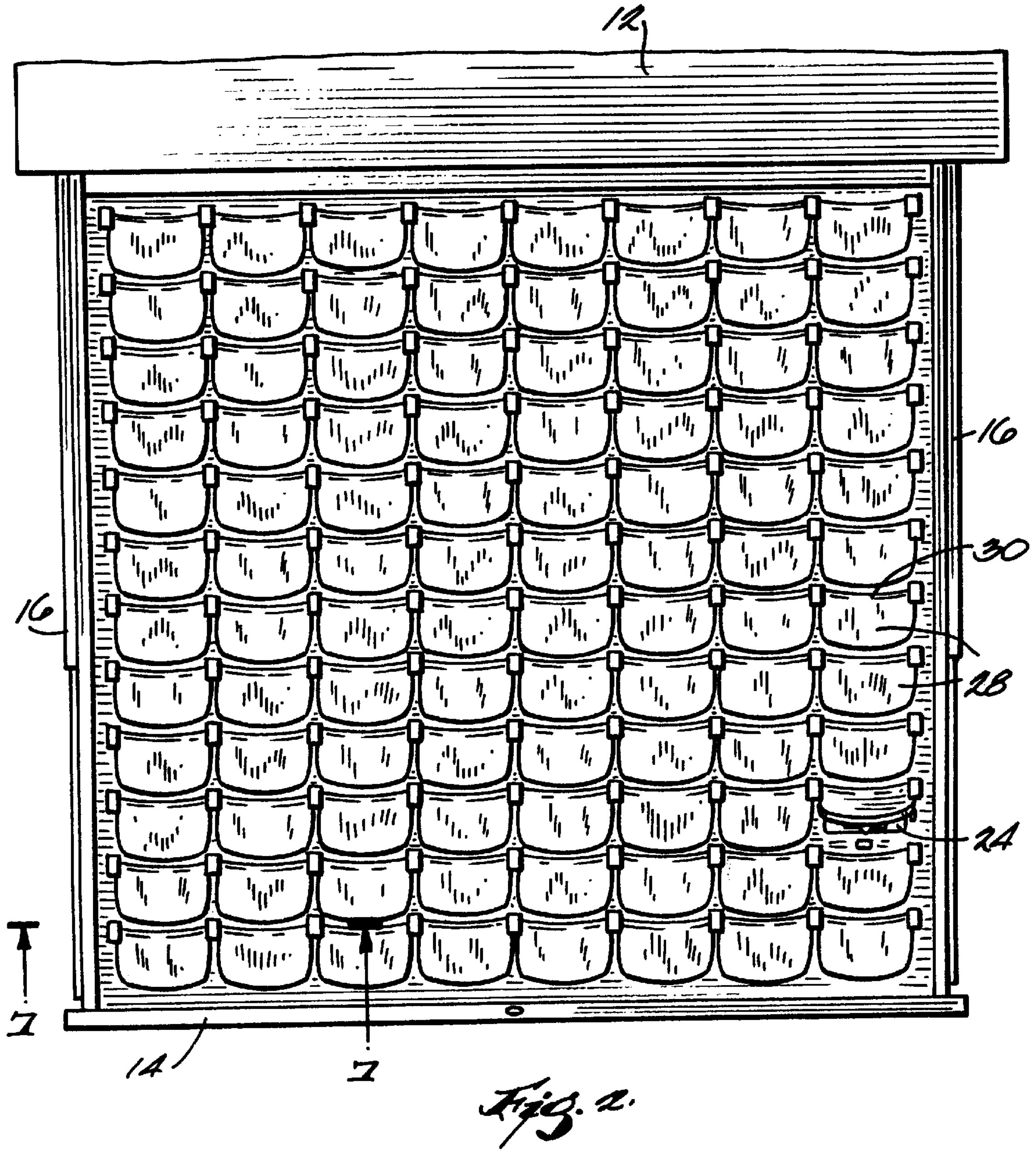
FIG. 2 is an enlarged plan view of one of the drawers of the dispensing apparatus shown in FIG. 1.

In the illustrated arrangement, each drawer 14 includes a plurality of compartments 24, each intended to house an article 26 to be dispensed. In the specific embodiment of the invention shown in the drawings, each drawer 14 includes eight rows of compartments 24, with each row including twelve compartments spaced apart from the front to the back of the drawer. In other embodiments of the invention, the drawers could have a variety of other arrangements of compartments and could have more or fewer compartments than illustrated. The compartments 24 are selectively covered by lids 28 which are each hinged at their rearward edge 30 such that they can be individually opened to permit access to an article 26 housed in the selected compartment 24. A particularly advantageous application for the cabinet 12 and drawer assembly 14 shown in FIGS. 1 and 2 is in dispensing single doses of pharmaceuticals or single units of medical supplies. In other arrangements, the cabinet 12 could also be useful in dispensing multiple doses or multiple units. While the compartments 24 and the respective lids 28 covering those compartments are shown as generally square when viewed in the plan view, in other arrangements the compartments 24 could be rectangular to accommodate elongated medical supply items, such as syringes.

Figures 3, 4:
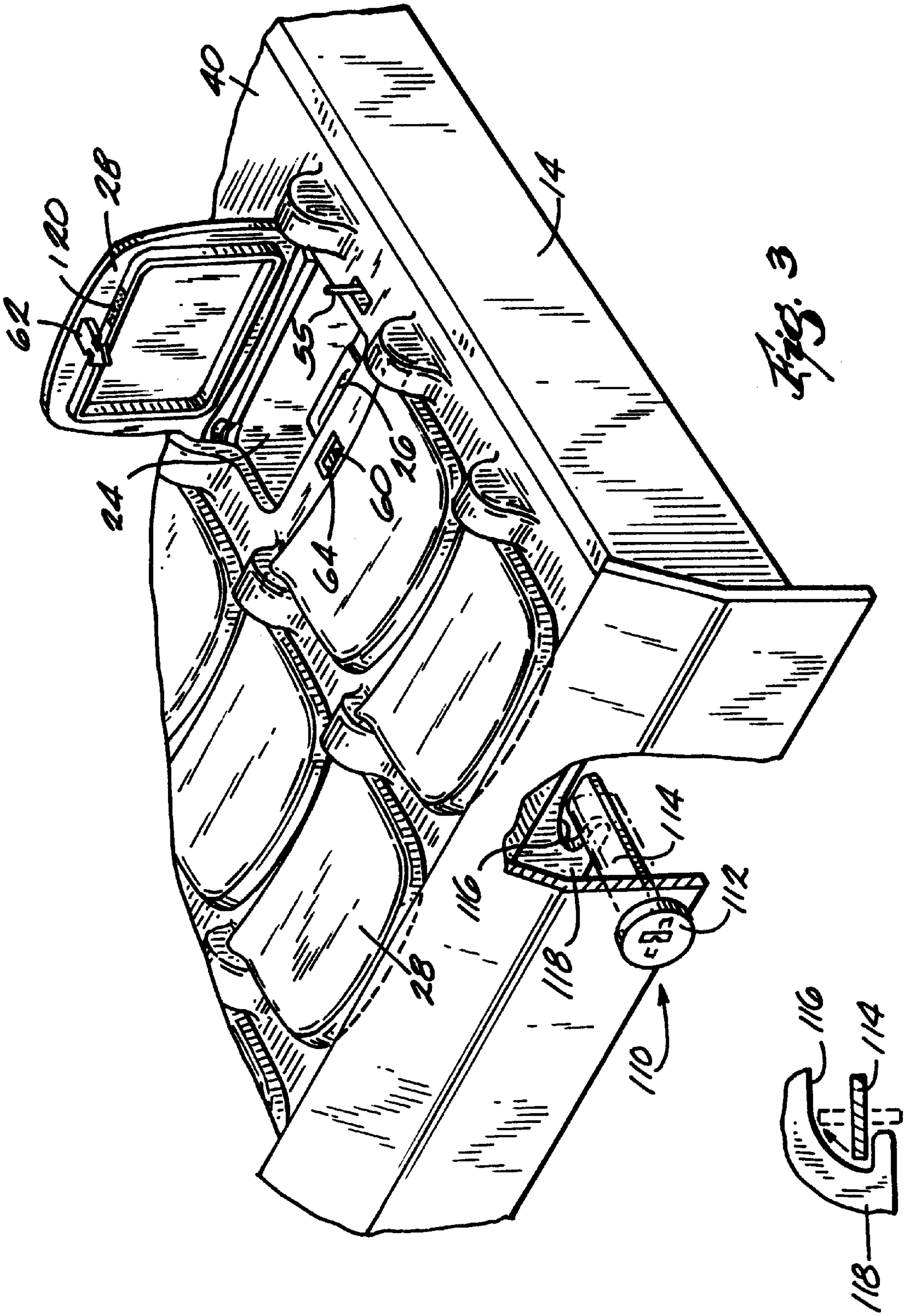
FIG. 3 is an enlarged perspective view of a portion of the drawer illustrated in FIG. 2.
FIG. 4 is a partial view of a drawer lock arrangement shown in FIG. 3.
Figure 5:
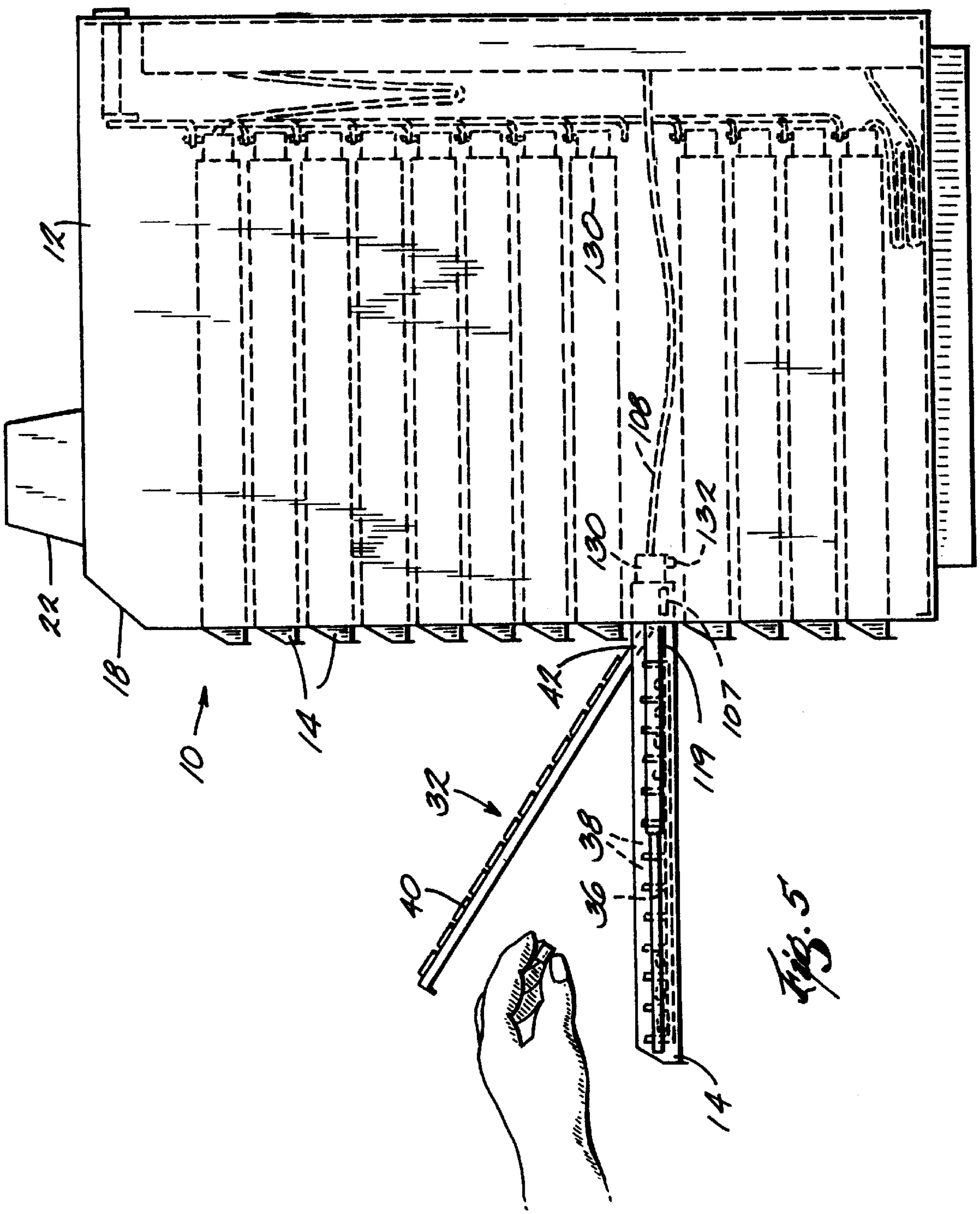
FIG. 5 is a side elevation view of the dispensing apparatus shown in FIG. 1 and showing a drawer extended for removal of a product from the drawer of the dispensing apparatus.
Figure 6:
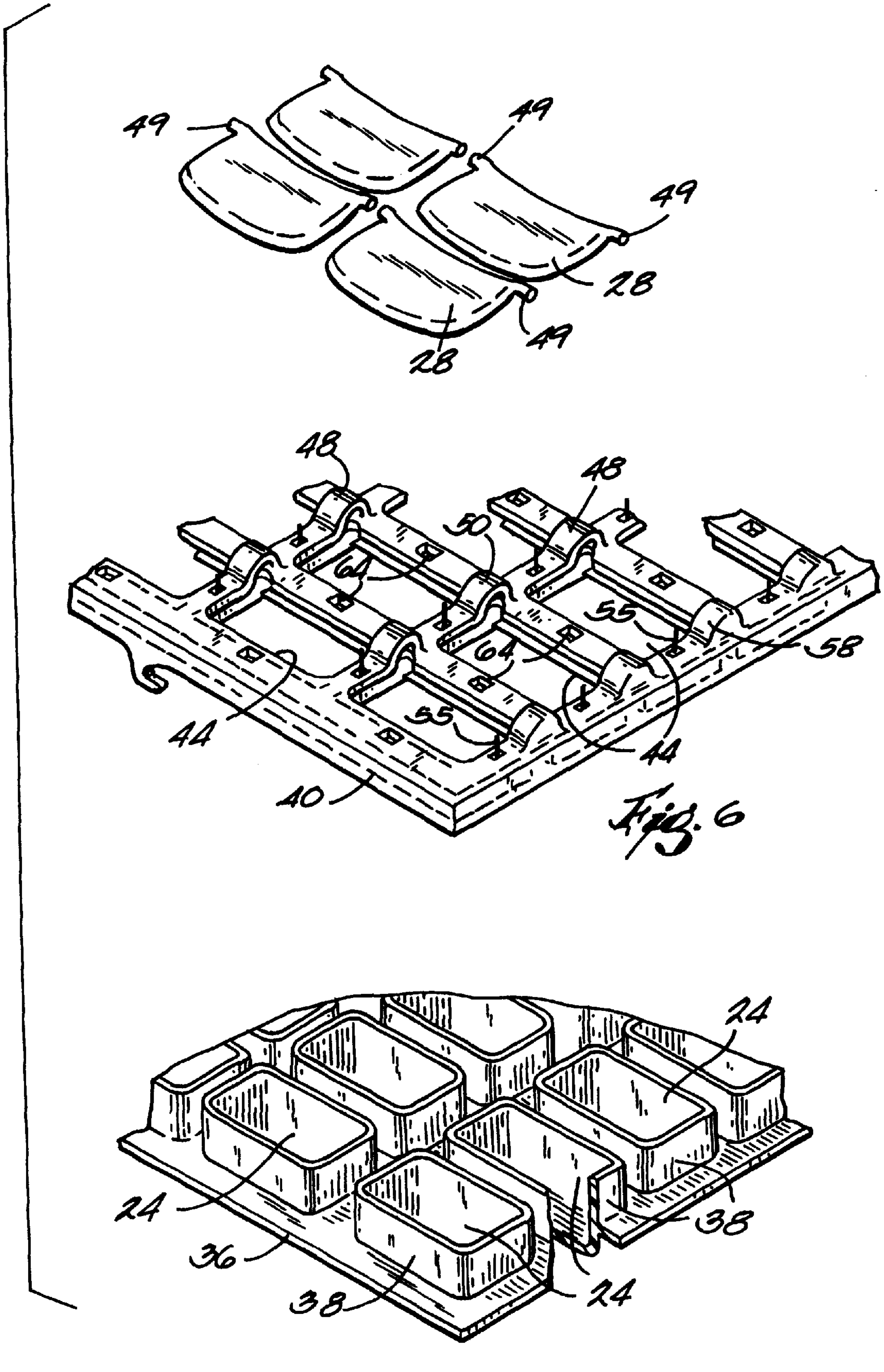
FIG. 6 is an exploded partial view of components of the drawer of the dispensing apparatus shown in FIG. 2.

The construction of each drawer assembly 32 is shown more specifically in FIGS. 2–3 and 5–11 and includes a slidable drawer 14 supported by the drawer slide 16 for manual forward and rearward movement into and out of the cabinet 12. Each drawer 14 includes a shallow space adapted to house a removable tray 36, the tray 36 including a plurality of rows of upwardly opening pockets 38 defining the compartments. The tray 36 is adapted to be covered by a hinged cover 40. The cover 40 is hinged at its rearward edge 42 to an upper and rearward portion of the drawer 14, such that the cover 40 can move from a raised position (FIG. 5) wherein the tray 36 can be removed from the drawer 14 to a position wherein the cover 40 lies over the trays 36 (FIG. 1 and FIG. 3). The cover 40 includes a plurality of openings 44 in an array arranged to overlie the compartments 24 of the tray 36 when the cover 40 is closed. The cover 40 also supports hinge assemblies for joining the lids 28 to the cover 40. As best shown in FIG. 6, each cover 40 is provided with pairs of upwardly projecting bosses 48 and 50 adapted to house pins 49 projecting from the opposite lateral sides of the lids 28 and so as to support the lids 28 for hinged movement between a closed locked position and an open position. Each lid 28 includes a spring 54 (FIGS. 10–12) supported by the cover 40 and having an end 55, which engages the lid 28 and functions to bias the lid 28 to the open position.

Figure 7:
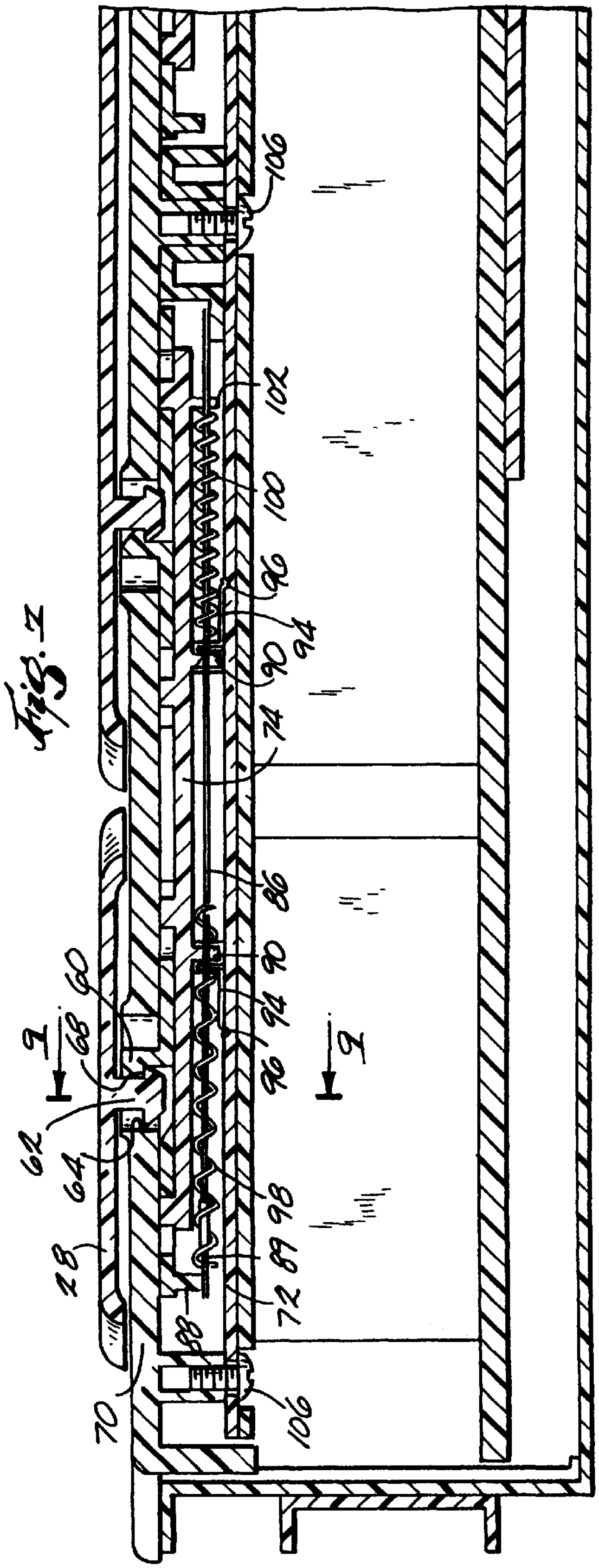
FIG. 7 is an enlarged cross-section view taken along line 7—7 in FIG. 2.
Figure 8:
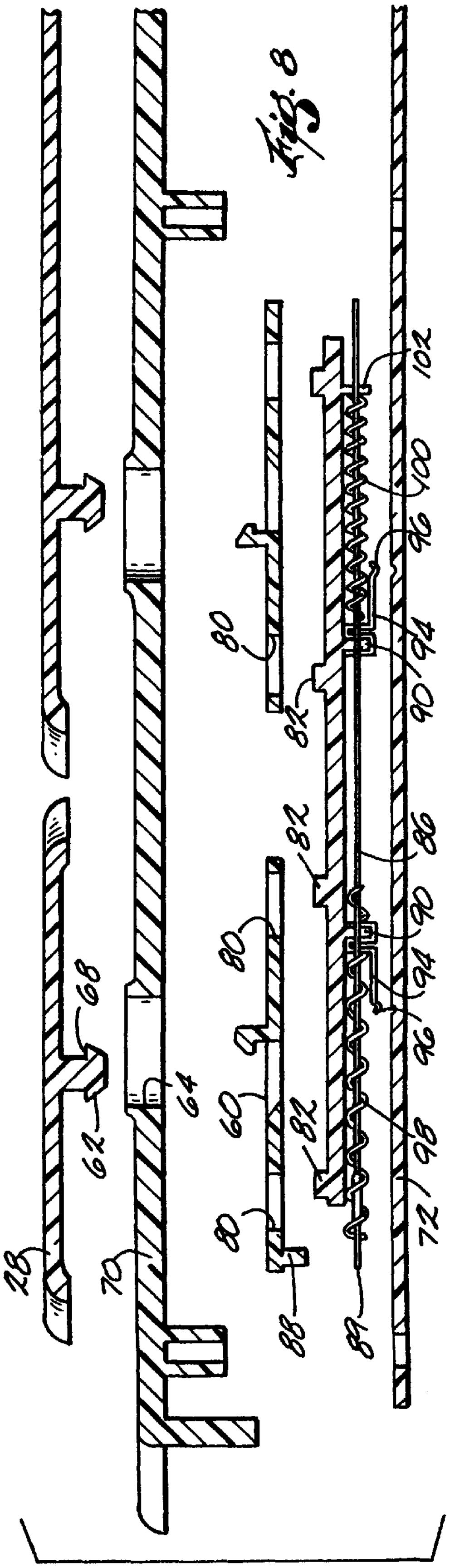
FIG. 8 is an exploded view of components shown in FIG. 7.

The cover 40 also includes an array of latches 60 for selectively locking the lids 28 individually. In the illustrated arrangement (FIGS. 7, 9, 12 and 13), each lid 28 includes a downwardly projecting pin 62 which extends into a complementary opening or recess 64 in the cover, as best illustrated in FIG. 3. As illustrated in FIG. 7, in the illustrated embodiment of the invention, the selectively actuatable latch member 60 is selectively engageable with the downwardly projecting pin 62 of the lid 28 when the pin 62 extends into the opening or recess 64 in the cover. The selectively actuated latch member 60 selectively engages the downwardly projecting pin 62 as shown in FIG. 7 to hold the lid 28 closed. The latch member 60 is reciprocally movable between a position wherein the latch member 60 engages a shoulder 68 of the pin 62 and a retracted position wherein the lid 28 is free to open. In the preferred arrangement, the spring 54 biases the lid to the open position when the latch member 60 releases the pin 62.

Figure 12:
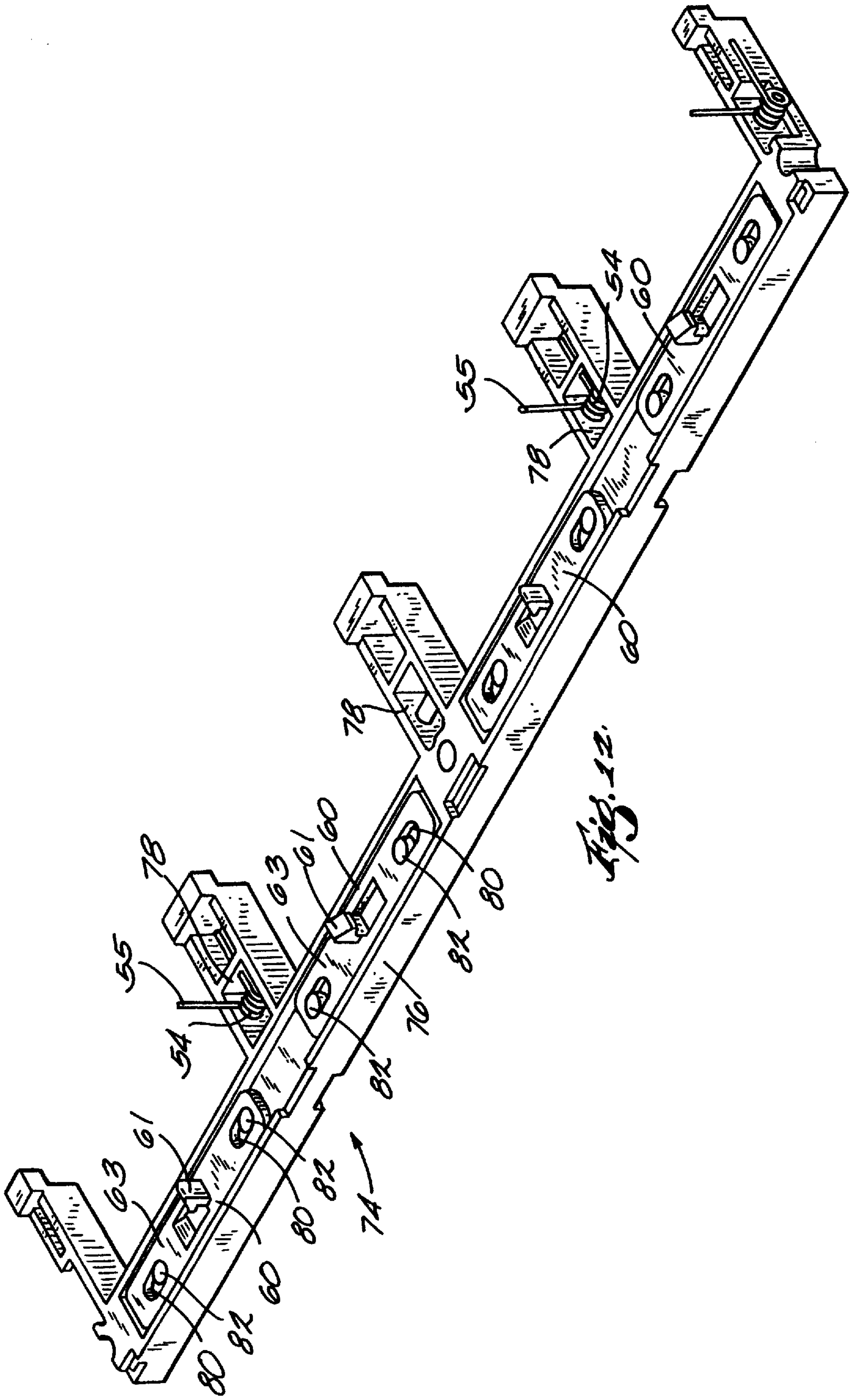
FIG. 12 is a perspective view of a portion of the drawer components shown in FIG. 9.
Figure 13:
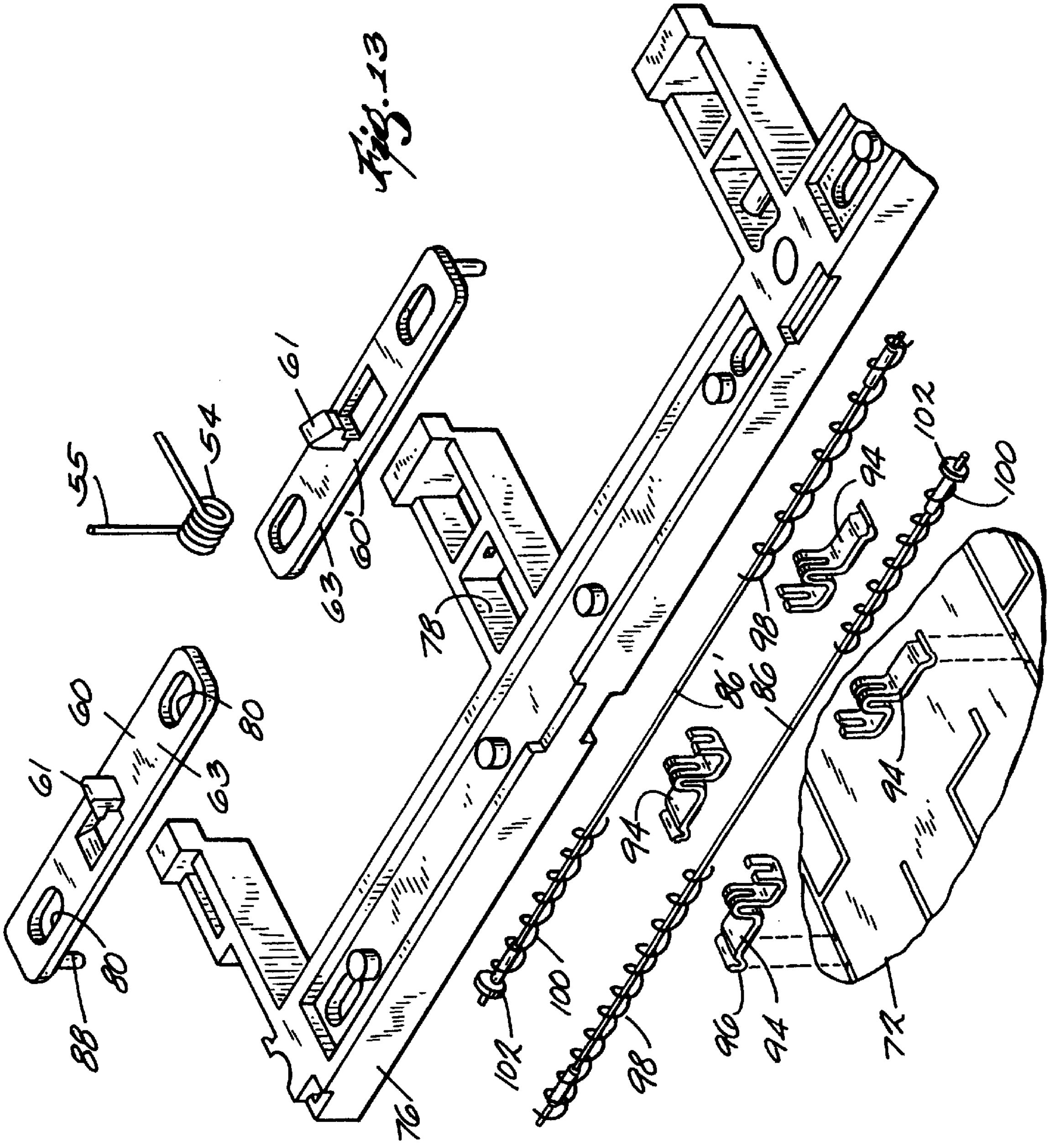
FIG. 13 is an exploded view of components shown in FIG. 12.

In the embodiment of the invention shown in FIGS. 3,5 and 7–13, the hinged cover 40 includes a top plate 70 and a printed circuit board 72 is secured to a bottom surface of the top plate 70. A plurality of latch assemblies 74, best shown in FIG. 12, are housed between the printed circuit board 72 and the top plate 70 and such that the latch assemblies 74 are fixed to the lower surface of the top plate 70 of the cover 40. The latch assemblies 74 each include a molded plastic housing or body 76 which can be positioned against the lower surface of the top plate 70. The molded plastic body 76 includes cavities 78 housing the springs 54 employed to bias the lids 28 open. The molded plastic body 76 also supports latch members 60 for limited slidable movement between a retracted position and an engaged locking position. Each latch member 60 includes an upwardly extending hook member 61 supported by a base plate 63 having a pair of slots 80 respectively housing upwardly projecting pins 82 of the molded plastic body 76, the slots 80 respectively housing the pins 82 and permitting limited linear reciprocal movement of the latch member 60.

Figure 9:
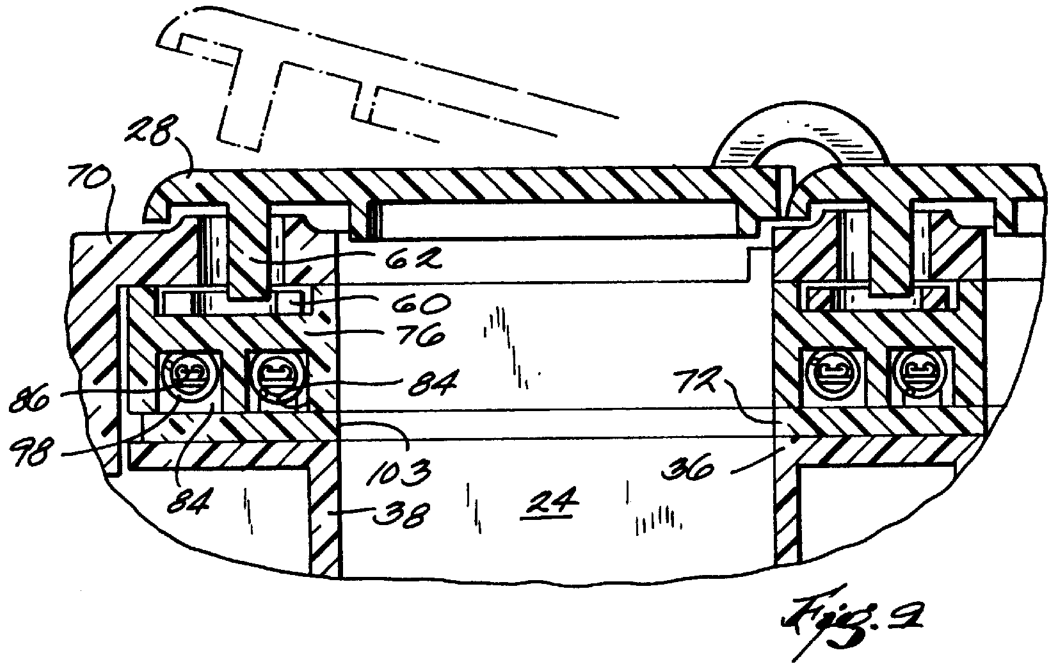
FIG. 9 is an enlarged cross-section view taken along line 9—9 in FIG. 7.
Figure 10:
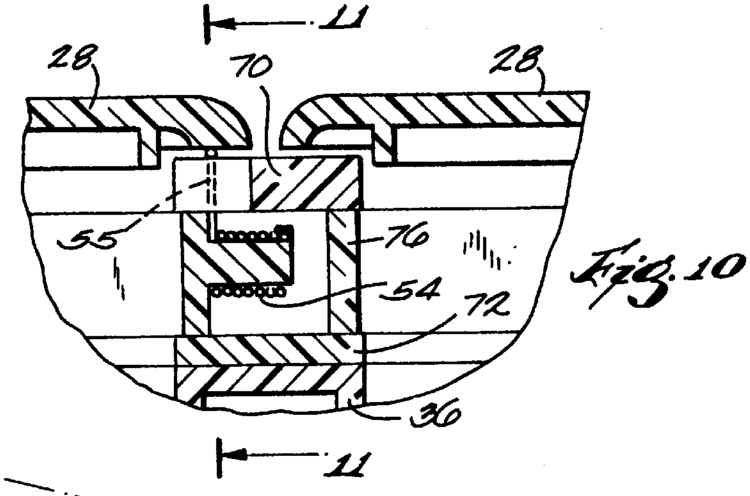
FIG. 10 is an enlarged cross-section of a portion of the drawer shown in FIG. 2.
Figure 11:
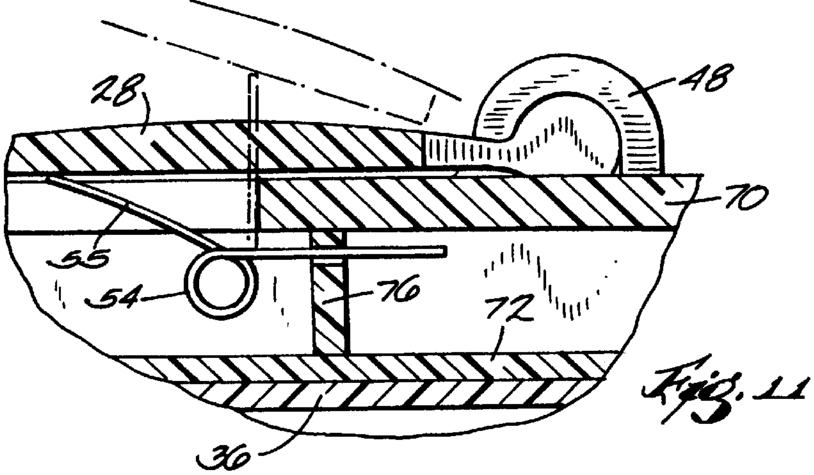
FIG. 11 is a cross-section view taken along line 11—11 in FIG. 10.

As best shown in FIGS. 7, 9 and 12, the lower portion of the molded plastic body 76 includes a pair of side by side channels 84. The channels 84 each house an electrically responsive shape memory alloy actuator wire 86. The actuator wires 86 are each in turn connected to a respective latch member 60 so as to cause selective movement of the latch member 60 between the locking position and the lid release position. In the arrangement shown in FIGS. 9, 12 and 13, actuator wire 86 is connected to latch member 60 to provide for movement of that latch member, and actuator wire 86' is connected to latch member 60' to provide for movement of that latch member. The construction and operation of actuator wires 86 and 86' is the same, and, accordingly, only the construction of the actuator wire 86 will be described. More specifically, a post or pin 88 (FIG. 7) projects downwardly from the latch member 60, and one end 89 of the shape memory actuator wire 86 is fixed to the post 88. The molded plastic body 76 includes a pair of bulkheads 90 projecting downwardly. The bulkheads 90 each support electrical contacts 94 which, in turn, have terminals 96 electrically connected to the circuit board 72. The actuator wire 86 extends through openings in the bulkheads 90 and electrically contacts the spaced apart electrical contacts 94.

A light compression spring 98 is disposed between the downwardly extending post 88 and the bulkhead 90 and biases the latch member 60 toward the closed or latched position. A second and somewhat heavier compression spring 100 is supported on the opposite end of the actuator wire 86 and is compressed between the bulkhead 90 and a stop member 102 which is crimped onto the end of the actuator wire 86.

In operation of the electrically responsive actuator wire 86, when an electrical current is provided through the contacts 94 then through springs 98 and 100 to the actuator wire 86, the wire 86 will contract in length. The heavier compression spring 100 fixed between the bulkhead 90 and the stop member 102 will tend not to compress and contraction of the actuator wire 86 will cause compression of the light compression spring 98 and will cause the latch member 60 to move to the right as shown in FIG. 7. When the electrical current to the actuator wire 86 is discontinued, the light compression spring 98 will cause the actuator wire 86 to return to its original length and will return the latch 60 to its closed or latch position.

In the event that the actuator wire 86 is actuated and the moveable latch member 60 is obstructed or otherwise prevented from moving, the contraction of the actuator wire 86 will be permitted by compression of the heavier compression spring 100.

In one embodiment of the invention, the shaped memory actuator wire 86 can be a FLEXINOL brand actuator wire manufactured by Dynalloy, Inc. of Irvine, Calif.

The printed circuit board 72 (FIGS. 7, 8 and 9) fixed to the lower surface of the top plate 70 includes electrically conductive paths arranged to be in contact with the electrical contacts 94. The printed circuit board 72 has a configuration complementary to the configuration of the cover top plate 70 in that the printed circuit board 72 includes a plurality of openings 103 (FIG. 9) which are aligned with the openings in the cover and the compartments defined by the tray. The printed circuit board 72 is secured to the lower surface of the top plate 70 by screws 106 (FIG. 7) or other suitable fasteners. The printed circuit board 72 also includes a terminal arrangement on its rearward edge to facilitate connection of the printed circuit board 72 to a microprocessor 107 located in a rearward portion of the drawer, and the microprocessor is in turn connected through a ribbon or electrical lead wire 108 (FIG. 5) to the processor 18.

As illustrated in FIGS. 3 and 4, a latch mechanism 110 is provided for releasably locking the cover 40 to the drawer 14 to prevent the cover 40 (FIG. 5) from being raised. The latch mechanism 110 is intended to prevent access to the tray 36 during normal operation of the dispensing unit, but to permit removal of the tray 36 from the drawer 14 for refilling or to permit unobstructed access to the contents of the drawer in the event of a medical emergency. While other arrangements could be provided for releasably locking the cover 40 to the drawer 14, in the illustrated arrangement, a key operated tumbler lock 112 is provided in the front of the drawer 14 and includes a rotatable latching member 114 cooperating with a slot 116 provided in the forward edge 118 of the cover 40. When the latching member 114 is housed in the slot as shown in FIG. 3, the cover is restrained from upward movement, and when the latching member is rotated to the position shown in phantom in FIG. 4 by actuation of the key operated tumbler, the cover 40 is released.

During use of the cabinet, using the key pad 20 of the processor 18, the medical personnel can enter a name, personal identification number or code into the processor. The medical personnel can also enter into the processor 18 patient information to identify the patient being treated and/or information identifying the pharmaceutical product or medical product to be dispensed. This information is processed and used to provide access to the appropriate drawers of the dispensing cabinet and to identify and open the appropriate compartment lids 28 for the medical personnel to thereby provide the appropriate medication or medical apparatus to be used for the selected patient. The processor will also record information regarding the products being dispensed and maintain inventory records, as well as patient billing information. In the case of dispensing controlled substances, the processor can restrict access to medications to those only having appropriate clearances and require identification of both the medical personnel and the patient before medication is made accessible.

The processor can also control dispensing of medications such that it will open only the appropriate lids 28 to dispense medication in the order that it was placed into the cabinet to provide a first in, first out dispensing system. This will permit maintenance of fresh inventory of medications or other medical supplies in the cabinet 12 and avoids the need to shift items in the drawers forwardly during the restocking process.

In those cases where the drawers 14 contain multiple doses of a selected medication, the processor 18 can open the compartment 24 containing the oldest dose of medication and thereby ensure the best possible use of the medications contained in the cabinet.

In another embodiment of the invention, the lids 28 may also include a sensor operably connected to the processor and for recording the opening of the lid. Such sensors would function to ensure accuracy in the dispensing operation. The sensors would be useful in recording the opening of the lids and could be used to trigger an alarm in the event of an attempted opening of an unauthorized lid 28.

In a preferred form of the invention, the cabinet can be moved to a pharmacy or other location for refilling, or the trays 36 can be removed from the drawers 14 and returned to the pharmacy or some other location for filling. The trays can also be filled by opening the lids of the empty compartments for refilling of compartments. In one embodiment of the invention, the trays 36 can be covered with a layer of foil or some other protective film to ensure the continuity and security of the contents of the tray. In the use of the dispensing apparatus, once the tray 36 is housed in the drawer and the lid 28 is opened, the foil or film can be pierced or torn to permit removal of the article housed in the compartment of the tray.

In one preferred embodiment of the invention, the tray can be provided with a proximity chip 119 (FIG. 5) which is intended to provide a signal to the processor 18 when the tray is properly positioned in the drawer. If the tray is improperly positioned in the drawer at the time that a filled tray is returned to the drawer, a signal will be sent to the processor to indicate to the pharmacist or medical personnel that the tray is improperly positioned. The proximity chip can also provide a signal to the processor the addition of a new tray of medical supplies or pharmaceuticals to the dispenser.

In a preferred form of the invention, the lids 28 of the covers 40 each include a color indicator 120 (FIG. 3) on a forward edge of the lid. This color indicator 120 is readily visible when the drawer 14 is extended and the lid 28 pops open as a result of release of the latch holding the lid closed and spring 55. The color indicator 120 will function to direct the medical personnel to the appropriate compartment of the drawer containing the medication or medical apparatus to be dispensed. The colored indicator 120 and the use of lids which will automatically open when actuated, have the advantage of providing an indicator to the medical personnel of the appropriate compartment without the use of lights or other electric signals to function as indicators to medical personnel. In other arrangements, indicator lights could be provided at each compartment to direct the attention of the user to the open compartment.

Figure 14:
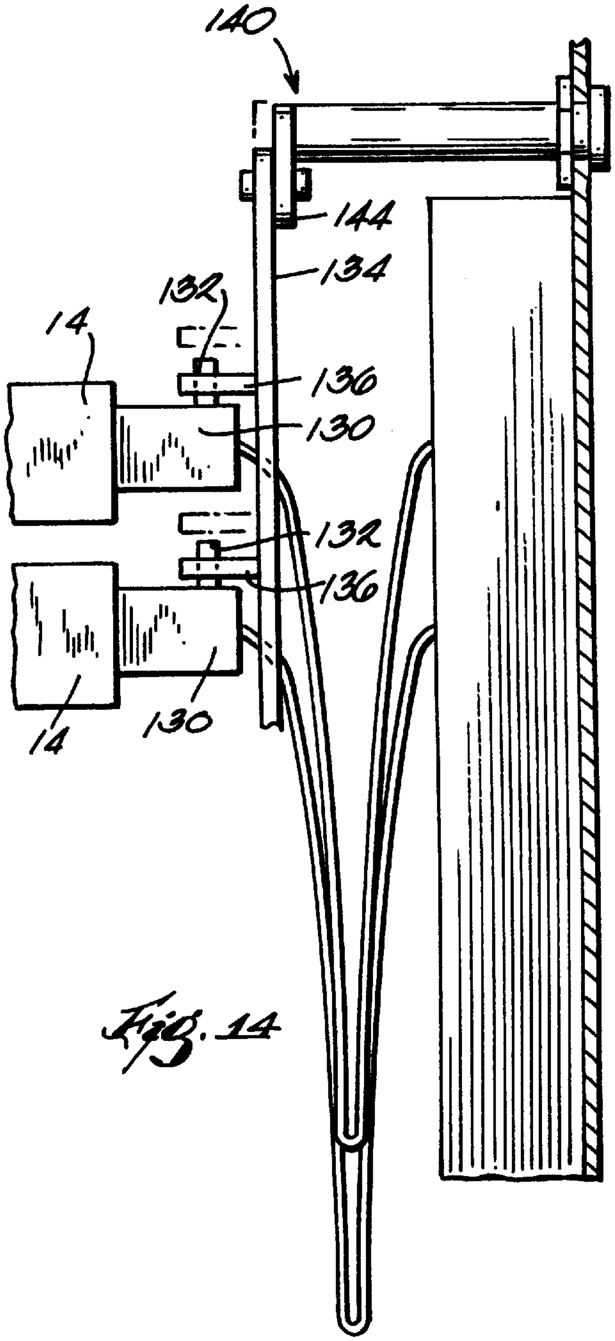
FIG. 14 is an enlarged cross-section view of a portion of the dispensing apparatus shown in FIG. 5.
Figure 15:
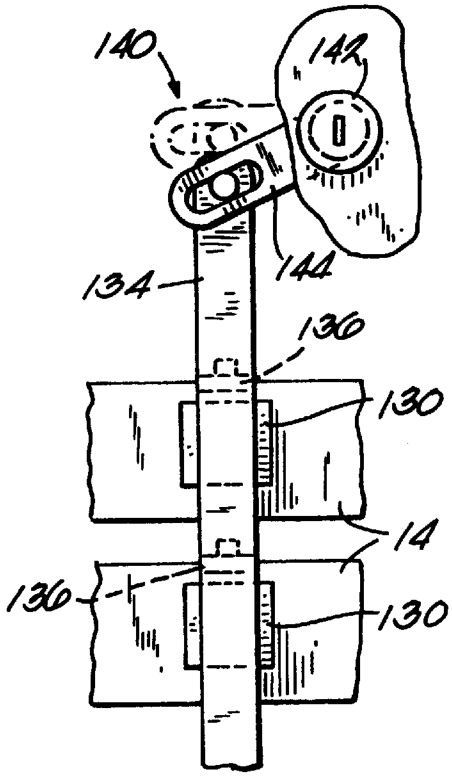
FIG. 15 is a partial cross-section view of components shown in FIG. 14.

In a preferred form of the invention, the dispensing cabinet also includes a lock assembly for releasably and selectively preventing the drawers 14 from being pulled to the open position. In the illustrated arrangement shown in FIGS. 5 and 14–15, each drawer 14 is provided with a solenoid actuated latch 130. The latches 130 each include a reciprocating member 132 which extends by actuation of the solenoids 130 which are in turn actuated by the processor 18. The dispensing cabinet 12 also includes a rod 134 having a plurality of latch members 136 projecting from the rod 134, the latch members 136 including openings adapted to house the reciprocating members 132 of the solenoids 130 and to selectively restrain the drawer 14 against outward movement. The rod 134 is supported by a key actuated lever mechanism 140. If a key is inserted into the tumbler lock 142, the lever 144 can function to lift the rod 134, thereby moving all of the latch members 136 out of engagement with the reciprocating members 132 of the solenoids 130 so that all of the drawers of the cabinet can be opened. This arrangement permits medical personnel to release all of the drawers of the cabinet in the event of a medical emergency or to facilitate filling of the dispensing cabinet.

In a preferred form of the invention, the drawers 14 can each also include an indicator light 150 (FIG. 1) which is illuminated when the drawer 14 is released and to provide a signal to the medical personnel that the drawer can be opened for removal of medication or medical supplies from the cabinet.

In operation of the dispensing cabinet, medical personnel enter identification into the processor to select the required medicine or medical equipment for a selected patient. The processor will then release the drawer or drawers containing the required products and the processor will also actuate the latch or latches of the compartments containing the required products. The lids of those compartments will open under the influence of the associated springs, and the open lids will include visual indicator means to readily indicate to medical personnel the location of the compartments containing the selected goods.

I claim:

1. A dispensing apparatus for controlled dispensing of pharmaceutical and medical supplies comprising:

a cabinet having an interior at least one drawer supported by the cabinet for movement between a storage position wherein the drawer is housed in the interior of the cabinet and an extended position wherein the drawer is accessible for removal of items from the drawer, the drawer having a plurality of receptacles, with each receptacle sized to hold at least one item, and wherein at least one of the receptacles includes a lid movable between a closed position and an open position, a selectively actuatable lock for releasably maintaining the lid in the closed position, the selectively actuatable lock including a lock member shiftable between a locking position and an unlocking position, and an electrically responsive actuator wire connected to the lock member and causing movement of the lock member in response to an electrical current supplied to the electrically responsive actuator wire, a processor in communication with the selectively actuatable lock and configured to send a signal to the electrically responsive actuator wire to unlock the lid.

2. A dispensing apparatus as set forth in claim 1 wherein said electrically responsive actuator wire includes opposite ends and wherein the length of the actuator wire changes in response to an electrical signal to the actuator wire.

3. A dispensing apparatus as set forth in claim 2 and further including a first spring connected to one of said opposite ends of said actuator wire, said first spring being compressed by movement of said lock member from said locking position to said unlocking position, said first spring biasing said lock member toward said unlocking position, and a second spring connected to the other of said opposite ends of said actuator wire to permit contraction of the actuator wire.

4. A dispensing apparatus as set forth in claim 2 wherein a first spring is connected to one of said opposite ends of said actuator wire and biases said lock member toward said locking position and wherein a second spring is connected to the other of said opposite ends of said actuator wire to resist contraction of said actuator wire.

5. A dispensing apparatus as set forth in claim 1 wherein the lid is supported such that it will open partially upon movement of the lock member to the unlocking position.

6. A dispensing apparatus as set forth in claim 1 and further including a spring for biasing said lid to at least a partially open position when said lock member shifts to an unlocking position.

7. A dispensing apparatus as set forth in claim 1 wherein said lid includes a visual indicator for providing a visual signal when the lid moves to an open position.

8. A dispensing apparatus as set forth in claim 1 wherein said lid includes a forward edge portion which is visually exposed when the lid is open and which is hidden when the lid is closed and wherein said forward edge includes a color patch to provide a visual indicator that the lid is open.

9. A dispensing apparatus as set forth in claim 1 wherein the processor includes means for receiving input user information and item identification information and for providing an output signal in response to such input information.

10. A dispensing apparatus as set forth in claim 1 wherein a plurality of the receptacles of the drawer are selectively closed by hinged lids and selectively actuatable locks are provided for selectively maintaining said lids closed, each of said selectively actuatable locks includes an electrically responsive actuator wire.

11. A dispensing apparatus as set forth in claim 1 wherein said electrically responsive actuator wire includes opposite ends, one of said opposite ends connected to said lock member and the other of said opposite ends being connected to said drawer, and wherein said electrically responsive actuator wire contracts in length when an electrical current is supplied to said electrically responsive actuator wire.

12. A dispensing apparatus as set forth in claim 1 and further including a drawer lock for selectively preventing movement of said drawer to the extended position, the processor being in communication with the drawer lock and configured to send a signal to unlock the drawer lock in response to identification information supplied to the processor.

13. A dispensing apparatus as set forth in claim 1 wherein the drawer includes a hinged cover covering the plurality of receptacles, the hinged cover being movable between an open position wherein the receptacles are exposed for removal of items and a closed position, the cover including a plurality of openings aligned over the receptacles when the hinged cover is in a closed position, the hinged cover supporting a plurality of hinged lids positioned over the receptacles.

14. A dispensing apparatus set forth in claim 13 wherein the cover includes a lower portion and further including a circuit board secured to said lower portion of said cover, said circuit board including a plurality of openings therethrough, said openings in said circuit board being aligned with said plurality of openings in said cover.

15. A dispensing apparatus as set forth in claim 14 wherein said lock member and said electrically responsive actuator wire are housed between said cover and said circuit board.

16. A dispensing apparatus as set forth in claim 13 wherein the lock member and the electrically responsive actuator wire are supported by the hinged cover for movement with the hinged cover.

17. A dispensing apparatus as set forth in claim 13 wherein the hinged cover includes a lower surface supporting the lock member and the electrically responsive actuator wire.

18. A dispensing apparatus as set forth in claim 13 wherein the lids are each supported by the cover for hinged pivotal movement with respect to the hinged cover.

19. A dispensing apparatus as set forth in claim 13 wherein the drawer includes a removable tray including said plurality of receptacles, and the tray is selectively covered by the hinged cover when the hinged cover is in the closed position and removable from the drawer for refilling when the hinged cover is moved to a raised position.

20. A dispensing apparatus as set forth in claim 19 wherein the removable tray includes an upper surface covered by a tearable substrate, the tearable substrate selectively sealing the receptacles until torn.

21. A dispensing apparatus as set forth in claim 20 wherein the tearable substrate is foil.

22. A dispensing apparatus as set forth in claim 20, further including sensor means between the drawer and the removable tray and providing a signal to the processor to indicate that the tray is properly positioned in the drawer.

23. A dispensing apparatus as set forth in claim 22 wherein the sensor means provides a signal to the processor to indicate to the processor that the proper tray is housed in the drawer.

24. A dispensing apparatus as set forth in claim 1, further including a plurality of touch sensitive buttons in communication with the processor and for providing input signals to the processor.

25. A drawer assembly for use in a dispensing apparatus for controlled single unit dispensing of pharmaceutical and medical supplies, the drawer assembly comprising:

at least one drawer adapted to be supported for movement between a storage position and an extended position wherein the drawer is accessible for removal of items from the drawer, the drawer having a plurality of receptacles, with each receptacle sized to hold a single item, at least a plurality of the receptacles including lockable lids, selectively actuatable locks for releasably locking said lockable lids to prevent access to said receptacles, each of said selectively actuatable locks including a lock member being shiftable between a locking position and an unlocking position, and an electrically responsive actuator wire connected to the lock member to cause movement of the lock member in response to an electrical signal being supplied to the electrically responsive actuator wire, the electrically responsive actuator wire being adapted to be actuated by a processor containing user information and item identification information.

26. A drawer assembly as set forth in claim 25 wherein said electrically responsive actuator wire shortens in response to an electrical signal to the actuator wire.

27. A drawer assembly as set forth in claim 25 and further including a drawer lock associated with said one drawer for selectively preventing movement of the drawer from the storage position to the extended position, the processor being in communication with the drawer lock and configured to send a signal to unlock the drawer lock in response to identification information.

28. A drawer assembly as set forth in claim 25 wherein the drawer includes a hinged cover covering the plurality of receptacles, the hinged cover being movable between an open position wherein the receptacles are exposed for removal of items and a closed position, the cover including a plurality of openings aligned over the receptacles when the hinged cover is in a closed position, the hinged cover supporting the plurality of hinged lids positioned over the receptacles.

29. A drawer assembly as set forth in claim 28 wherein the lock members and the electrically responsive actuator wires are supported by the hinged cover for movement with the hinged cover.

30. A drawer assembly as set forth in claim 28 wherein the hinged cover includes a lower surface supporting the lock members and the electrically responsive actuator wires.

31. A drawer assembly as set forth in claim 28 wherein the lids are each supported by the cover for hinged pivotal movement with respect to the hinged cover.

32. A drawer assembly as set forth in claim 28 wherein the cover includes a plurality of rows of openings separated by linear extending ribs, and wherein said lock members and said electrically responsive actuator members are supported by said ribs.

33. A drawer assembly as set forth in claim 28 and further including a removable tray including said plurality of receptacles, and the tray is selectively covered by the hinged cover when the hinged cover is in the closed position and removable from the drawer for refilling when the hinged cover is moved to a raised position.

34. A drawer assembly as set forth in claim 33 wherein the removable tray includes an upper surface covered by tearable substrate, the tearable substrate selectively sealing the receptacles until torn.

35. A dispensing apparatus as set forth in claim 34 wherein the tearable substrate is foil.

36. A dispensing apparatus for controlled dispensing of pharmaceutical and medical supplies comprising:

a cabinet having an interior at least one drawer supported by the cabinet for movement between a storage position wherein the drawer is housed in the interior of the cabinet and an extended position wherein the drawer is accessible for removal of items from the drawer, the drawer housing a tray having a plurality of upwardly open receptacles, with each receptacle sized to hold at least one item, the drawer including a hinged cover covering the tray and the plurality of receptacles, the hinged cover being movable between an open position wherein the receptacles are exposed for removal of items and a closed position, the cover including a plurality of openings aligned over the receptacles when the hinged cover is in a closed position, the hinged cover supporting a plurality of hinged lids positioned over the receptacles, each lid supported by the cover and movable between a closed position and an open position, each lid including a selectively actuatable lock, the selectively actuatable lock including a lock member shiftable between a locking position and an unlocking position, a processor for receiving user information and item identification information, the processor being in communication with each of the selectively actuatable locks and configured to send a signal to unlock at least one selected lid based on identification information supplied to the processor, and an electrically responsive actuator wire operably connected to the lock member to selectively move the lock member to the unlocking position, the electrically responsive actuator wire including opposite ends and wherein the length of the electrically responsive actuator wire changes in response to an electrical signal to the actuator wire from the processor.

37. A dispensing apparatus as set forth in claim 36 wherein the lids are each supported by the cover for hinged pivotal movement with respect to the hinged cover.

38. A latch for use in a dispensing apparatus for controlled dispensing of pharmaceutical and medical supplies, the dispensing apparatus having a cabinet having an interior and at least one drawer supported by the cabinet for movement between a storage position wherein the drawer is housed in the interior of the cabinet and an extended position wherein the drawer is accessible for removal of items from the drawer, the drawer having a plurality of receptacles, with each receptacle sized to hold at least one item, and wherein at least one of the receptacles includes a lid movable between a closed position and an open position, the latch comprising:

a lock member supported by the drawer and shiftable between a locking position wherein the lock member restrains the lid in the closed position and an unlocking position wherein the lock member releases the lid to permit the lid to move to the open position, an electrically responsive actuator wire connected to the lock member to cause movement of the lock member in response to an electrical current supplied to the electrically responsive actuator wire.

39. A latch as set forth in claim 38 wherein the dispensing apparatus further includes a processor for receiving user information and item identification information, and wherein the processor is in communication with the electrically responsive actuator wire and configured to send a signal to the electrically responsive actuator wire to unlock the lid based on identification information supplied to the processor.

40. A latch for use in a dispensing apparatus as set forth in claim 38 wherein the length of the actuator wire changes in response to an electrical signal to the actuator wire.

41. A latch for use in a dispensing apparatus as set forth in claim 38 wherein the electrically responsive actuator wire includes opposite ends, one of said opposite ends connected to said lock member and the other of said opposite ends being connected to said drawer, and wherein said electrically responsive actuator wire contracts in length when an electrical current is supplied to said electrically responsive actuator wire.

42. A dispensing apparatus for controlled dispensing of supplies comprising:

at least one storage member, the storage member having at least one receptacle, with the receptacle sized to hold at least one item, and wherein the receptacle includes a lid movable between a closed position and an open position, a selectively actuatable lock for releasably maintaining the lid in the closed position, the selectively actuatable lock including a lock member shiftable between a locking position and an unlocking position, and an electrically responsive actuator wire connected to the lock member and causing movement of the lock member in response to an electrical current supplied to the electrically responsive actuator wire, a processor in communication with the selectively actuatable lock and configured to send a signal to the electrically responsive actuator wire to unlock the lid.

43. A dispensing apparatus as set forth in claim 42 wherein said electrically responsive actuator wire includes opposite ends and wherein the length of the actuator wire changes in response to an electrical signal to the actuator wire.

44. A dispensing apparatus as set forth in claim 42 wherein said lid is supported such that it will open partially upon movement of the lock member to the unlocking position.

45. A dispensing apparatus as set forth in claim 42 and further including a spring for biasing said lid to at least a partially open position when said lock member shifts to an unlocking position.

46. A dispensing apparatus as set forth in claim 42 wherein said lid includes a visual indicator for providing a visual signal when the lid moves to an open position.

47. A dispensing apparatus as set forth in claim 42 wherein said lid includes a forward edge portion which is visually exposed when the lid is open and which is hidden when the lid is closed and wherein said forward edge includes a color patch to provide a visual indicator that the lid is open.

48. A dispensing apparatus as set forth in claim 42 wherein the processor includes means for receiving input user information and item identification information and for providing an output signal in response to such input information.

49. A dispensing apparatus as set forth in claim 42 wherein the storage member includes a plurality of receptacles and wherein the plurality of the receptacles of the storage member are selectively closed by hinged lids and selectively actuatable locks are provided for selectively maintaining said lids closed, each of said selectively actuatable locks including an electrically responsive actuator wire.

50. A dispensing apparatus as set forth in claim 42 and further including sensor means between the storage member and the receptacle and providing a signal to the processor to indicate that the receptacle is properly positioned in the storage member.

51. A dispensing apparatus as set forth in claim 50 wherein the sensor means provides a signal to the processor to indicate to the processor that the proper receptacle is housed in the storage member.

52. A dispensing apparatus as set forth in claim 42 and further including a plurality of touch sensitive buttons in communication with the processor and for providing input signals to the processor.

53. A storage device for use in controlled dispensing of supplies, the storage device comprising:

at least one receptacle sized to hold at least one item, the receptacle including a lockable lid, a selectively actuatable lock for releasably locking said lockable lid to prevent access to said receptacle, said selectively actuatable lock including a lock member shiftable between a locking position and an unlocking position, and an electrically responsive actuator wire connected to the lock member to cause movement of the lock member in response to an electrical signal being supplied to the electrically responsive actuator wire, the electrically responsive actuator wire being adapted to be actuated by a processor containing user information and item identification information.

54. A storage device as set forth in claim 53 wherein said electrically responsive actuator wire shortens in response to an electrical signal to the actuator wire.

55. A latch for use in a dispensing apparatus for controlled dispensing of supplies, the dispensing apparatus having a receptacle, the receptacle sized to hold at least one item, and wherein the receptacle includes a lid movable between a closed position and an open position, the latch comprising:

a lock member supported by the receptacle and shiftable between a locking position wherein the lock member restrains the lid in the closed position and an unlocking position wherein the lock member releases the lid to permit the lid to move to the open position, an electrically responsive actuator wire connected to the lock member to cause movement of the lock member in response to an electrical current supplied to the electrically responsive actuator wire.

56. A latch as set forth in claim 55 and wherein the dispensing apparatus further includes a processor for receiving user information and item identification information, and wherein the processor is in communication with the electrically responsive actuator wire and configured to send a signal to the electrically responsive actuator wire to unlock the lid based on identification information supplied to the processor.

57. A latch as set forth in claim 55 wherein the length of the actuator wire changes in response to an electrical signal to the actuator wire.

* * * * *